Patented Dec. 8, 1942

2,304,669

UNITED STATES PATENT OFFICE 2,304,669

ISOLATION OF CANNABIDIOL

Roger Adams, Urbana, Ill.

No Drawing. Application August 16, 1940,
Serial No. 352,931

4 Claims. (Cl. 260—619)

It has been found that from the extracts of hemp (*Cannabis sativa* or *Cannabis indicia*) a red viscous oil can be obtained, commonly known as red oil, from which a pure crystalline compound, cannabidiol, can be isolated (Adams, Hunt and Clark, J. A. C. S. 62, 196 (1940). Through a chemical study (J. A. C. S. 62, 196, 732, 735, 1770 (1940); see also J. A. C. S. August and September numbers, 1940), it has been shown to have the structural formula:

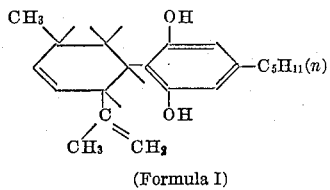

(Formula I)

With the exception of the position of the double bond in the left hand cycle in the above formula the structure of cannabidiol is well established. Investigations show this left hand cycle to be a tetrahydro benzene ring.

Cannabidiol is a crystalline compound, M. P. 66–67° (cor.), and forms long white rods when crystallized from petroleum ether (B. P. 30–60°). It has an $[\alpha]^{27}D -125°$, and is physiologically inactive so far as marihuana activity is concerned.

It has now been found that cannabidiol isomerizes upon treatment, for example, with a variety of reagents such as hydrochloric acid and ethanol, hydrogen chloride in ether, pyridine hydrochloride, sulfamic acid, zinc chloride, ethanolic phosphoric acid, etc. and is converted to tetrahydro cannabinol which has marihuana activity. The isomerizing processes and resulting physiologically active tetrahydro cannabinols form the subject matter of my co-pending application Serial No. 440,971.

The principal object of the present invention is to provide an improved process for isolating cannabidiol from red oil obtained from hemp.

Other objects of the present invention will be apparent as the description proceeds.

The isolation of cannabidiol from red oil obtained from hemp is described in detail in J. A. C. S. 62, 196 (1940). This process which includes the treatment of purified red oil with 3,5-dinitrobenzoyl chloride and the formation of cannabidiol bis-3,5-dinitrobenzoate has been found of particular value for the isolation of the desired product. Ammonolysis of the benzoate, i. e. diester, yields cannabidiol in pure form.

The process as set forth in the J. A. C. S. 62, 196, 198, 199 (1940) serves to illustrate the present invention.

*Cannabidiol bis-3,5-dinitrobenzoate.*—A solution of about 50 grams of purified red oil, B. P. 175–195° C. (2 mm.), in 200 cc. of dry pyridine was poured rapidly with shaking and cooling on 85 grams of 3,5-dinitrobenzoyl chloride. The mixture was heated on a steam cone for two hours with occasional shaking and was then poured into ice and hydrochloric acid (200 cc. of concentrated hydrchloric acid, 500 cc. of ice). It was filtered or decanted and the insoluble material was washed several times with dilute hydrochloric acid. The residue was dissolved in 600 cc. of benzene and filtered. The insoluble material consisted mainly of 3,5-dinitrobenzoic acid.

The benzene solution was washed with dilute hydrochloric acid, then with aqueous sodium bicarbonate and finally with water. The benzene was evaporated and the residue was dissolved in 500 cc. of dry ether. This solution was treated with norit (20 grams), filtered, and then concentrated to 300 cc. On cooling in an ice-salt mixture with constant stirring, crystallization set in. After one hour, the product was filtered and washed with cold dry ether. Upon purification of the desired product by recrystallization from 800 cc. of a mixture of methanol and methyl acetate (2:1), it was obtained as white rods M. P. 106–107° C. (corr.).

*Cannabidiol.*—A solution of 50 grams of cannabidiol bis-3,5-dinitrobenzoate in 100 cc. of toluene was placed in the glass liner of a high pressure bomb. The mixture was cooled by dry-ice and about 100 cc. of liquid ammonia passed into it. The liner was then placed in the bomb and the cover quickly fastened. The bomb was allowed to stand for five hours at room temperature. At the end of that time the excess ammonia was allowed to escape and the product, which had set to a solid mass, was digested with 400 cc. of petroleum ether (B. P. 60–110° C.). The solid 3,5-dinitrobenzamide was filtered and washed with two 50 cc. portions of petroleum ether. Filtrate and washings were combined and extracted six times with 150 cc. portions of boiling water to remove the last traces of 3,5-dinitrobenzamide. The petroleum ether was then evaporated and the residue distilled, B. P. 187–190° C. (2 mm.) (bath temperature 220° C.). The resulting product, i. e. cannabidiol, was obtained as a pale yellow resin.

It will be obvious to those skilled in the art that the present invention is not limited to the details of the process outlined above. The scope of the present invention accordingly should be determined by the claims annexed hereto.

I claim:

1. In a process for isolating cannabidiol from red oil obtained from hemp, the step which consists in treating the red oil with 3,5-dinitrobenzoyl chloride to form cannabidiol bis-3,5-dinitrobenzoate.

2. In a process for isolating cannabidiol from red oil obtained from hemp, the step which consists in isolating the cannabidiol from said oil as the dinitrobenzoate ester.

3. A process for isolating substantially pure cannabidiol from red oil obtained from hemp which comprises (a) treating hemp red oil with 3,5-dinitrobenzoyl chloride, (b) separating the cannabidiol bis-3,5-dinitrobenzoate formed in (a) from the red oil mixture, and (c) subjecting the benzoate ester of (b) to ammonolysis.

4. The product cannabidiol bis-3,5-dinitrobenzoate.

ROGER ADAMS.